United States Patent Office 3,331,847
Patented July 18, 1967

3,331,847
N,N′-BIS(LOWER ALKYL) 3,4,9,10-PERYLENE TETRACARBOXYLIC ACID DIIMIDE PIGMENT AND PROCESS THEREFOR
Herman Gerson, New York, N.Y., and William E. Bachmann, North Haledon, N.J., assignors to Allied Chemical Corporation, New York, N.Y., a corporation of New York
No Drawing. Filed Apr. 13, 1964, Ser. No. 359,399
8 Claims. (Cl. 260—281)

This invention relates to a method of N-alkylating 3,4,9,10-perylene-tetracarboxylic acid diimides to prepare therefrom new N,N′-bis (lower alkyl) 3,4,9,10-perylene tetracarboxylic acid diimides. In particular, this invention relates to a process for preparing a new composition of matter useful as a pigment in plastics such as polypropylene.

N,N′-bis (lower alkyl) 3,4,9,10-perylene tetracarboxylic acid diimides are important pigments for coloring enamels, printing inks, and plastics such as polypropylene, polyethylene tetraphthalates and superpolyamides. For instance, the N,N′-dimethyl derivative which is also a valuable vat dyestuff (Color Index 71130) is of especial importance in view of its desirable red brick color and its exceptional light fastness. The methods of preparing alkyl derivatives of 3,4,9,10-perylene tetracarboxylic acid diimides such as the dimethyl derivatives have not been entirely satisfactory from a commercial standpoint. For example, it has been the practice to prepare the dimethyl derivative by heating the diimide with an alkylating agent such as methyl chloride at a temperature of between 90 and 100° C. and at a pressure of about 8 atmospheres in the presence of strong, e.g., about 1.5 molar aqueous caustic employing about 12 mols of caustic per mol of diimide. Such process is disclosed in IG Farbenindustrie PB73726 Reel 21G Frs. 99–101. This process however requires large and costly amounts of alkylating agent, i.e., about 11.6 mols of methyl chloride per mol of diimide thereby corresponding to about a 480% mol excess. Moreover, the process is further disappointing in that the resulting product has a low color strength and necessitates further conditioning for many end uses including use as a pigment in polypropylene. Such conditioning normally includes an acid pasting procedure performed with sulfuric acid. Methods heretofore proposed to rectify the problems inherent in the process include converting the diimide firstly to the corresponding dialkali metal salt by treatment with strong aqueous alkali. The salt is subsequently separated, dried and alkylated in an anhydrous medium such as orthodichlorobenzene, the alkylation proceeding in the presence of a small amount of basic reagent such as 0.62 mol alkali metal carbonate per mol of diimide. This process enables use of substantially less alkylating agent than the first mentioned process, i.e., about 2.5 mols of an aromatic sulfonic acid ester such as methyl-p-toluene sulfonate per mol of diimide corresponding to a 0.25% mol excess. However, in solving some of the problems of the first process the second process necessarily necessitates tedious separation and drying of the diimide salt prior to alkylation and additional expense due to the use of organic solvent. The product furthermore is not substantially different from the product of the first process and still requires further treatment to render it suitable for use as a pigment.

It is an object of this invention therefore to provide a process which can be operated in an easy manner and does not entail tedious separation procedures or use of costly materials.

It is a further object of this invention to provide a process for producing a new lower alkyl derivative of 3,4,9,10-perylene tetracarboxylic acid diimide which product does not necessitate use of conditioning procedures to make it suitable for use as a pigment or the like.

These and other objects and advantages of this invention will become more apparent from the following complete description of our invention.

In accordance with our invention N,N′-bis(lower alkyl) 3,4,9,10-perylene tetracarboxylic acid diimides are produced by:

(a) Digesting 3,4,9,10-perylene tetracarboxylic acid diimide in the presence of at least 6 mols of alkali metal hydroxide per mol of diimide.

(b) Neutralizing the resultant product with a mineral acid, the amount of acid being such that the amount of alkali metal hydroxide used is at least 3 more weight equivalents of base than acid employed and the acid being sufficient to adjust the pH of the solution to between 10 and 13.5.

(c) Heating the resultant diimide under pressure with at least the theoretical proportions of an alkylating agent to accomplish dialkyl substitution, i.e., in the presence of at least 2 available alkyl groups for alkylation per mol of diimide.

In a particularly desirable embodiment of this invention the above process is carried out in the presence of a phosphate salt of the group di and tri alkali metal ortho phosphate, tetraalkali metal pyrophosphate and pentaalkali metal tripolyphosphate, the phosphate being present in the range of about 0.5 to 2.0 mols per mol of diimide.

In our process the temperature in the digestion procedure is generally in the range of between ambient and 95° C. and the reaction takes place generally over a period of between 6 and 20 hours. However, the reaction time, as well as the reaction temperature, can vary over a broad range in our process and hence neither of these are particularly critical. Under normal reaction conditions we have found that the digestion intermediate is suitably formed at 6 hours digestion time and digestion time over 20 hours adds nothing to the process and represents only loss of time. Likewise, temperatures over 95° C. while useful are not preferred since they too add nothing to the process but only represent added expense.

On the other hand, we have found that it is extremely critical to employ amounts of caustic in the digestion step and amounts of acid in the neutralization step such that there is at least 3 more weight equivalents of base employed than acid and that the pH of the mass after the neutralization step is in the range of between 10 and 13.5, preferably, 12–13. This pH range of 10 to 13.5 can be obtained, for example, by digesting 1 mol of diimide with 12 mols of aqueous caustic soda and thereafter, adding from about 6 to 9 mols of hydrochloric acid. To illustrate, we have found that by using even 2.89 more weight equivalents of base than acid employed, the alkylation does not proceed to completion and hence our new product is not provided upon alkylation. Furthermore, at a pH below 10 the intermediate product after the digestion and neutralization steps is not formed entirely and the alkylation procedure cannot be performed satisfactorily as complete dialkyl substitution is not obtained. pH above 13.5 after neutralization causes products of low color strength and undesirably large amounts of alkylating agent, e.g., 400% or higher mole excess are required to drive the reaction to completion.

In the digestion step, as indicated above, it is necessary to use at least 6 mols of alkali metal hydroxide as the suitable digestion step intermediate is not prepared with use of substantially less than 6 mols of the hydroxide. The upper amount of hydroxide per mol of diimide is set by practical limitations, as use of substantially more than 12 molar equivalents of alkali metal hydroxide per mol of diimide is unnecessary, particularly since the amount of hydroxide is neutralized in the neutralization step to a pH between 10 and 13.5, hence high amounts of hydroxide necessitate large amounts of acid in the neutralization step and accordingly such operation is not preferred. Suitable alkali metal hydroxides for use in this process include NAOH and KOH.

In the alkylation procedure, we can employ any alkylating agent having lower alkyl groups available for alkylation. By the terms "lower alkyl" we mean any alkyl group having between 1 and 6 carbon atoms. Such alkylating compounds useful as alkylating agents in our process include lower alkyl halides, lower alkyl esters of aromatic sulfonic acid, and bis-(lower alkyl) esters of sulfuric acid, the compounds being present in an amount where there is at least twice the number of alkyl groups in the alkylating agent available for alkylation per mol of diimide. We prefer however a 100 to 300% excess over that theoretically required for the dialkylation and especially a 250% mole excess. The 100% excess is preferred because amounts substantially less than 100% may not totally prevent hydrolysis in the case of compounds such as methyl chloride. Use of more than 300% excess over that theoretically required for the dialkylation is not necessary and benefits are not derived therefrom. Hence, it represents merely a waste of chemicals thereby decreasing the economical benefit derived from the instant process.

While the reaction conditions of temperature and pressure employed by prior art procedures can be effectively used in the alkalation step of our process, we prefer to employ substantially lower reaction temperatures and pressures, e.g., a temperature of about 55–70° C. especially about 65° C. We have found that when the temperature is slightly above 70° C. the product is slightly inferior to the product obtained between 55 and 70° C. On the other hand temperatures below 55° C. necessitate increased pressures on the reaction mixture with undesirable attendant cost.

Our process can be effected by digesting the diimide with aqueous caustic alkali, e.g., using at least 6 mols of caustic alkali per mol of diimide. An excellent result is generally obtained by digesting diimide with about 12 molar equivalents of caustic alkali in an aqueous medium of about 10% by weight caustic alkali concentration. For this digestion step, such amount of aqueous caustic is used to provide an easily stirrable digestion mass containing preferably 12 to 20 parts by weight of water per part of diimide although other concentrations of water can be effectively employed. Advantageously, digestion is carried out with efficient agitation for about 6 to 20 hours and at a temperature of about ambient to 95° C. It is believed that the digestion under these conditions provides an intermediate of the diimide which is particularly amenable to alkylation to a superior product than heretofore obtained by alkylation of the diimide by prior art procedures. The nature of the intermediate diimide after the important neutralization step is not known nor is the intermediate obtained upon the digestion. In any event, in our process the intermediate diimide thus obtained is alkylated directly, i.e., without isolation from the aqueous medium of formulation, after its pH has been adjusted as above described.

With respect to pressure used during the alkylation procedure we can use effectively pressures between 60 and 75 p.s.i.g. especially between about 60 and 65 p.s.i.g. at temperatures in our preferred range, i.e., 55 to 70° C. which pressures are notably lower than those used by the prior art. High pressures are undesirable where lower alkyl chlorides are used as the alkylating agent since slight corrosion of the apparatus may occur.

In carrying out the N-alkylation according to our novel process no special equipment need be provided as conventional equipment such as an autoclave equipped with agitation means is most suitable. If desired although not absolutely necessary, the reaction system can be purged of oxygen by passing nitrogen gas through the reaction vessel prior to alkylation procedure. This removal of oxygen from the reaction vessel is preferred since oxygen can cause deleterious oxidation of the dialkyl substituted diimide if the oxygen is present with the pigment for a substantial period of time. In that case, the color quality of the product is somewhat inferior.

As indicated above the alkylation procedure is preferably performed in the presence of a phosphate. The action of the phosphate on the alkylation procedure or the resultant product is not understood but it is believed to provide some type of a buffering effect. In any event it causes production of a dialkylated diimide useful directly as a pigment in plastics such as polypropylene without any acid pasting procedure or the like. The phosphate can be present in amounts ranging from 0.5 to 2.0 mols per mole of diimide. Use of substantially less than 0.5 mol of phosphate has little effect while use of substantially more than 2.0 mole of phosphate per mol of diimide is unnecessary and hence wasteful.

On completion of the alkylation step in our process, the reaction mass is conventionally digested with dilute aqueous alkali, e.g., heated for about 1 hour at 75 to 80° C. with aqueous 0.03 M caustic. The product is separated by the usual means, e.g., filtration and is washed free from inorganic salts and alkali with water.

In order to more fully illustrate the nature of this invention and the manner of practicing the same, the following examples are set forth. In these examples parts are by weight and temperatures are in degrees centigrade unless otherwise indicated.

EXAMPLE 1

In a stainless-steel autoclave a mixture containing 300 parts (0.769 mol) of 3,4,9,10-perylene tetracarboxylic diimide, 375 parts (9.38 mols) of sodium hydroxide, and 4260 parts of water was agitated for 16 hours at ambient temperature. Over a period of about one hour 612 parts of aqueous 20° Bé. hydrochloric acid containing 192.3 parts (5.28 mols) of hydrogen chloride were added and the mixture was agitated for one hour. The pH of the slurry as measured with a Leeds and Northrup pH meter No. 7664 (measuring electrode Std. 1199–44) was about 12.8±0.1. After addition of 225 parts (0.845 mol) of anhydrous tetrasodium pyrophosphate sufficient water was charged to provide 5500 parts by volume of reaction mass. The reaction mass was heated to 65° C. and the autoclave was purged with a stream of nitrogen gas for about 15 minutes. Over a period of about 13 hours 260 parts (5.15 mols) of methyl chloride was charged to the agitated mixture under a pressure of about 60–65 p.s.i.g. at 65±2° C. After the pH of the mass was adjusted to about 12.0 by addition of 133 parts of 50% aqueous sodium hydroxide, the mass was heated at 75–80° C. for one hour and filtered. The N,N'-dimethyl-3,4,9,10-perylene-tetracarboxylic diimide which was collected was washed free of alkali and water soluble salts with water at 60° C. and dried at 60° C. A mull in Litho-Varnish, (trademark of Interchemical Corporation) a refined linseed oil, of the red pigment obtained had a darker masstone and slightly yellower undertone than a similar mull of the acid pasted product obtained in accordance with the process of PB73726 Fr. 99–101, Reel 21G, above cited.

In order to illustrate the advantages of the instant process over processes heretofore proposed, the following test is set forth:

Test 1

The process of Example 1 was repeated substantially as described except that no hydrochloric acid was added after digestion; 200 parts of trisodium phosphate dodecohydrate were used in place of tetrasodium pyrophosphate; and 628 parts (12.43 mols) of methyl chloride instead of 260 parts (5.15 mols) as in Example 1 was required for complete methylation of the diimide. A mull of the re-

EXAMPLE 2

200 g. caustic soda liquid (50%) was added to 1300 ml. of aqueous slurry containing 120 g. 3,4,9,10-perylene tetracarboxylic acid diimide and the mass was agitated for 21 hours at ambient temperature. 181 g. muriatic acid (20° Bé.) and 80 g. Na$_3$PO$_4$.12H$_2$O were added and the mass was placed in a stainless steel autoclave and methylated under agitation at 65–70° C. and 60–65 lbs. methylchloride pressure until the reaction was complete. The autoclave was vented, 75 g. caustic soda liquid (50%) was added and the mass was stirred one hour at 75–80° C. After filtering, washing alkali free and drying at 80° C. a mull in Litho-Varnish was obtained in the usual way and was found to be darker in mass tone than the acid pasted product standard produced by a process similar to PB73726 Fr. 99–101, Reel 21G and showed a slightly bluer and stronger undertone.

EXAMPLE 3

The procedure of Example 2 was repeated except that 160 g. of anhydrous Na$_5$P$_3$O$_{10}$ was used in place of the Na$_3$PO$_4$.12H$_2$O and the result was substantially the same except that the pigment tested was slightly weaker than the standard of Example 2.

EXAMPLE 4

An aqueous 3,4,9,10-perylene tetracarboxylic acid diimide slurry as used in Example 2 was charged into a vessel with 152.5 g. solid potassium hydroxide and the mass was stirred for about 21 hours. 60.5 g. phosphoric acid (85%) was then added and the mass was methylated and isolated as in Example 2. The resulting pigment was substantially the same as that produced in Example 2. This example illustrates the use of an alternative alkali and mineral acid to produce a potassium phosphate buffer in situ. Tetrasodium pyrophosphate as used in Example 1 appears to give the best all around results, and accordingly, is preferred in the practice of our invention.

It can thus be seen that an improved process for preparing N,N'-bis (lower alkyl) 3,4,9,10-perylene tetracarboxylic acid diimides and especially pigmentary forms thereof has been devised.

Although the above example is particularly directed to preparation of the N,N'-dimethyl-3,4,9,10-perylenetetracarboxylic acid diimide employing methyl chloride as alkylating agent, any of the following alkylating agents wherein the alkyl group contains 1 to 6 carbon atoms can be used in the proportions equivalent to methyl chloride and with otherwise the procedure of the above Example 1 to prepare the bis lower alkyl diimides shown.

| | |
|---|---|
| Dimethyl sulfate | N,N'-dimethyl 3,4,9,10-perylene tetracarboxylic acid diimide. |
| Methyl p-toluene sulfonate | Do. |
| n-Pentyl iodide | N,N'-di(n-pentyl) 3,4,9,10-perylene tetracarboxylic acid diimide. |
| Isopropyl bromide | N,N'-di(isopropyl) 3,4,9,10-perylene tetracarboxylic acid diimide. |
| Ethyl benzene sulfonate | N,N'-diethyl 3,4,9,10-perylene tetracarboxylic acid diimide. |
| Di (n-propyl) sulfate | N,N'-di(n-propyl) 3,4,9,10-perylene tetracarboxylic acid diimide. |

Suitable alkali metal phosphates employed in the preferred embodiment of our process include the following typical examples — trialkali metal orthophosphates: Na$_3$PO$_4$, K$_3$PO$_4$; dialkali metal ortho phosphates: Na$_2$HPO$_4$, K$_2$HPO$_4$; tetraalkalimetal pyrophosphates: Na$_4$P$_2$O$_7$, K$_4$P$_2$O$_7$; pentaalkali metal tripolyphosphates: Na$_5$P$_3$O$_{10}$, K$_5$P$_3$O$_{10}$.

Use of a trialkali metal orthophosphate or a tetraalkali metal pyrophosphate provides an especially good pigment. All of the phosphates are employed suitably in the same molar proportions as anhydrous tetrasodium pyrophosphate in Example 1 without variation in the manipulative procedure.

It is to be noted that in carrying out our process water can be employed in the aqueous alkylation mixture to provide a relatively non-viscous, easily stirrable mass, obtainable generally with about 15 or more parts of water per part by weight of diimide and use of a non-viscous reaction mass is preferred in the operation of our process.

It is seen from the foregoing that this invention provides an economical process for dialkylation of 3,4,9,10-perylene tetracarboxylic acid diimide with a resultant product superior to products obtained by prior art processes. It is not known why the product produced is so superior but it is believed that the use of the digestion step coupled with the neutralization step in our process allows ready alkylation of the diimide intermediate to form this new composition of matter particularly when a phosphate as above defined is present. It is apparent from the foregoing that our process does not necessitate use of expensive reagents or solvents and can be performed without tedious separation procedures and the like.

Although certain preferred embodiments of the invention have been disclosed for purposes of illustration it will be evident that various changes and modifications can be made therein without departing from the spirit and scope of this invention.

We claim:

1. A process for preparing N,N'-bis (lower alkyl) 3,4,9,10-perylene tetracarboxylic acid diimides which comprises:
    (a) digesting 3,4,9,10-perylene tetracarboxylic acid diimide in the presence of at least 6 mols of alkali metal hydroxide per mol of diimide;
    (b) neutralizing the resultant product with a mineral acid, the amount of acid being such that the amount of alkali metal hydroxide used is at least three more weight equivalents of base than acid employed and the acid being sufficient to adjust the pH of the solution to between 10 and 13.5;
    (c) heating the resultant diimide under pressure with at least the theoretical proportions of an alkylating agent selected from the group consisting of an alkyl halide, an alkyl ester of an aromatic sulfonic acid and a bis-(alkyl)ester of sulfuric acid wherein the alkyl groups of said alkylating agent contain from one to six carbon atoms to accomplish dialkyl substitution.

2. The process of claim 1 wherein the alkylating agent is methyl chloride.

3. The process of claim 1 wherein the alkylation is performed in the presence of a phosphate selected from the group consisting of a dialkali metal orthophosphate, trialkali metal orthophosphate, tetraalkali metal pyrophosphate and pentaalkali metal tripolyphosphate, at least about 0.5 mol of said phosphate being present per mol of said diimide.

4. The process of claim 3 wherein 100 to 300% excess of alkylating agent over that theoretically required for the dialkylation is employed, the temperature of the reaction in the alkylation step is between 55° and 70° C. and the pressure is between 60 and 75 p.s.i.g.

5. The process of claim 4 wherein the alkali metal hydroxide is a member selected from the group consisting of sodium hydroxide and potassium hydroxide.

6. The process of claim 3 wherein the alkylating agent is methyl chloride and the phosphate is present in an amount of about 0.5 to 2.5 mol per mol of diimide.

7. The process of claim 6 wherein the phosphate is tetrasodium pyrophosphate.

8. A new pigmentary composition prepared by:
    (a) digesting 3,4,9,10-perylene tetracarboxylic acid diimide in the presence of at least 6 mols of alkali metal hydroxide per mol of diimide;
    (b) neutralizing the resultant product with a mineral acid, the amount of acid being such that the amount of alkali metal used is at least three more weight equivalents of base than acid employed and the acid being sufficient to adjust the pH of the solution to between 10 and 13.5;

(c) heating the resultant diimide under pressure in the presence of 0.5 to 2.0 mol of tetrasodium pyrophosphate per mol of diimide with at least 2 mols of methylchloride per mol of diimide.

References Cited

UNITED STATES PATENTS

| | | | |
|---|---|---|---|
| 2,794,805 | 6/1957 | Schmidt-Nickels | 260—281 |
| 2,820,797 | 1/1958 | Jacob et al. | 260—326 |

ALEX MAZEL, *Primary Examiner.*

D. G. DAUS, *Assistant Examiner.*